(12) United States Patent
Murthi et al.

(10) Patent No.: US 11,914,498 B2
(45) Date of Patent: *Feb. 27, 2024

(54) SELECTIVE INDUCTION OF BINARY CODE AT RUN-TIME FOR WEB-BASED CUSTOMER SERVICE

(71) Applicant: Bank of America Corporation, Charlotte, NC (US)

(72) Inventors: Naveen Kumar Reddy Murthi, Telangana (IN); Udaya Kumar Raju Ratnakaram, Telangana (IN); Punit Srivastava, Bear, DE (US); Jian James Chen, Hockessin, DE (US)

(73) Assignee: Bank of America Corporation, Charlotte, NC (US)

( * ) Notice: Subject to any disclaimer, the term of this patent is extended or adjusted under 35 U.S.C. 154(b) by 230 days.

This patent is subject to a terminal disclaimer.

(21) Appl. No.: 17/209,487

(22) Filed: Mar. 23, 2021

(65) Prior Publication Data

US 2022/0308983 A1 Sep. 29, 2022

(51) Int. Cl.
*G06F 9/445* (2018.01)
*G06F 11/36* (2006.01)
*G06F 9/455* (2018.01)
*G06F 8/65* (2018.01)
*G06F 8/41* (2018.01)

(52) U.S. Cl.
CPC ............ *G06F 11/3612* (2013.01); *G06F 8/41* (2013.01); *G06F 8/65* (2013.01); *G06F 9/45516* (2013.01); *G06F 11/3624* (2013.01); *G06F 11/3644* (2013.01); *G06F 11/3688* (2013.01)

(58) Field of Classification Search
CPC ............ G06F 11/3664; G06F 11/3612; G06F 11/3624; G06F 11/3668; G06F 11/3644
See application file for complete search history.

(56) References Cited

U.S. PATENT DOCUMENTS

| | | | | |
|---|---|---|---|---|
| 6,986,132 B1 * | 1/2006 | Schwabe | ............. | G06F 9/44589 717/170 |
| 11,163,669 B1 * | 11/2021 | Torun | ......................... | G06F 8/65 |
| 2013/0326333 A1 * | 12/2013 | Hashmi | ................. | G06F 16/958 715/234 |
| 2015/0089656 A1 * | 3/2015 | Pappas | .................... | G06F 21/57 726/25 |

* cited by examiner

*Primary Examiner* — S. Sough
*Assistant Examiner* — Mohammad H Kabir
(74) *Attorney, Agent, or Firm* — Weiss & Arons LLP

(57) ABSTRACT

Apparatus and methods for deploying a web application including a plurality of binary objects. The methods may include isolating from the plurality of class files a class file in which a run-time behavior occurs. The methods may include updating the class file to produce a modified class file that does not have the behavior. The methods may include testing performance of the modified class file. The methods may include storing the class file in a dynamic configuration database. The methods may include recognizing the modified class file as being modified. The methods may include, using a cron job processor, reading the metadata. The methods may include compiling the modified class file into binary code. The methods may include executing the binary code instead of a different binary code that corresponds to the class file in which the run-time behavior occurs.

18 Claims, 8 Drawing Sheets

SELECTIVE INDUCTION OF BINARY CODE AT RUN-TIME FOR WEB-BASED CUSTOMER SERVICE

BACKGROUND

In some object-oriented applications, there is a need for regularly upgrading the state and behavior of objects. Objects are updated, built into a deployable file format, and then deployed. The deployment may involve parallel deployment to multiple servers. The deployment may involve deployment to multiple datacenters. The servers and datacenters may handle requests for information or services. Load balancers may distribute the requests among the servers or datacenters. Sustaining a service level to the information requesters may therefore require such deployment. The deployment may involve routing traffic away from datacenters, routing traffic into datacenters, validating data initializers to check the validity of queries to external systems, regression testing, certification and other steps. The update may be minor, and yet may still involve such a deployment.

It would therefore be desirable to provide apparatus and methods for efficient deployment of upgrades to a web-based application.

BRIEF DESCRIPTIONS OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
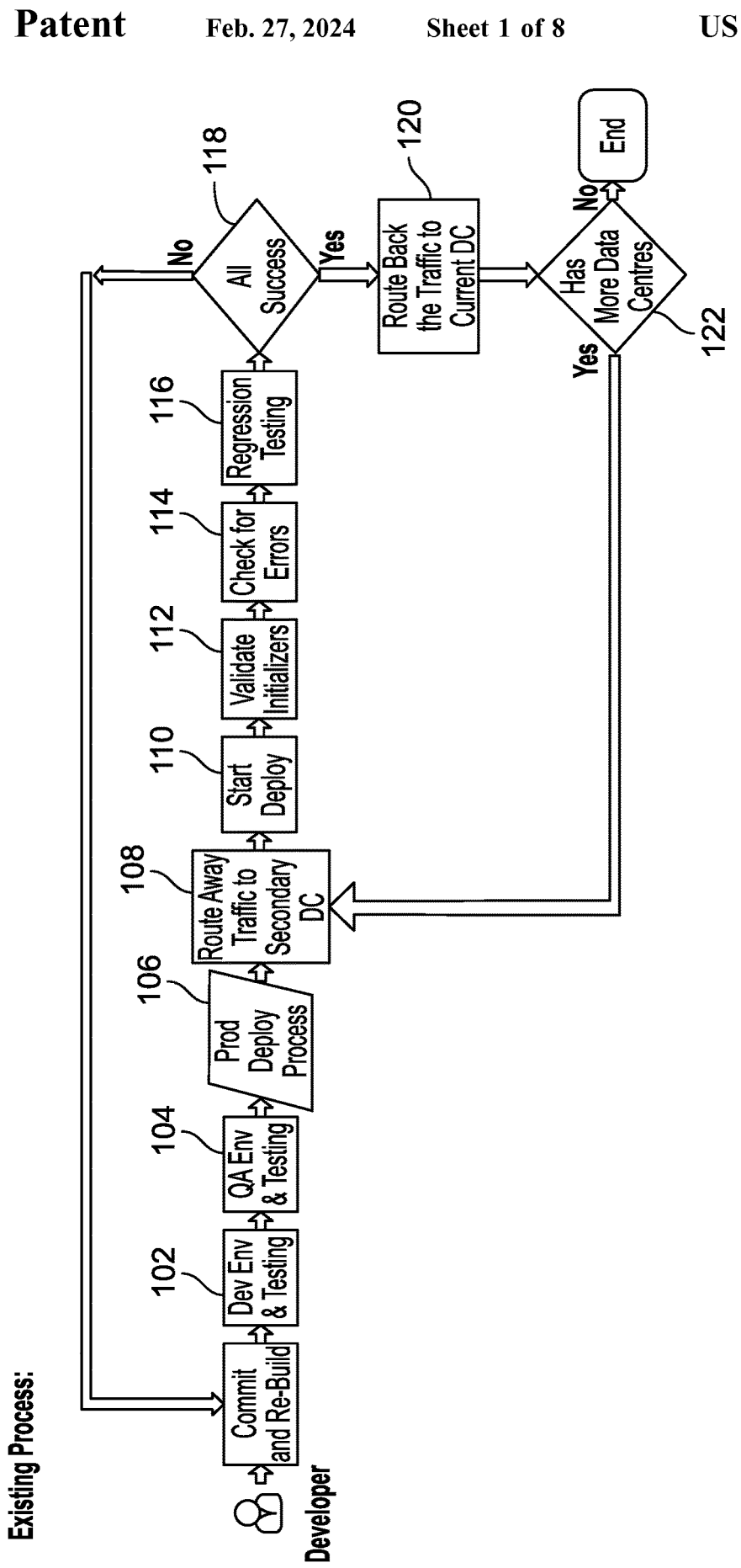
FIG. 1 shows prior art.

When a web application performance issue or business need arises, the web application may benefit from a functional revision. The class, or file, in which the revision is to take place may be identified. The file may be a Java file. The class may be treated as an object. Code for the class may be revised or updated. The object may be configured for storage in a database. The database may be a dynamic configuration database. Metadata may be associated with the object. The metadata may be configured to facilitate induction of the object into the application at run-time. Table 1 lists illustrative metadata that may be included.

TABLE 1

| Illustrative illustrative metadata |
| --- |
| Application identifier (interface name) |
| Object identifier (class name) |
| Object revision date |
| Object state (e.g., account number, balance, last five transactions, receipt e-mail address, etc.) |
| Object behavior (e.g., receive customer instruction, provide balance, deliver cash, apply debit to account, etc.) |
| Priority (for order of compilation by runtime compiler; relative to priorities of other objects; assigned administratively) |
| Other suitable illustrative metadata |

The object may be pushed to the database. The table may be stored with the object in the database. Some or all of the metadata may be stored in a central table in the database in a database table. Table 2 shows illustrative central table entries.

TABLE 2

| Illustrative central table entries | | | | | | |
| --- | --- | --- | --- | --- | --- | --- |
| Application identifier | Object identifier | Object revision date | Object upload (to database) date | Object state | Object behavior | Priority |
| Online services | OI12345 | RD01012021 | RD01022021 | ABC1 | DEF1 | B-1 |
| Account management | OI12346 | RD01042021 | RD01122021 | ABC3 | DEF5 | C-9 |
| New product search | OI15321 | RD02252020 | RD03052020 | ABC27 | DEF36 | A-3 |
| Customer services | OI09321 | RD12142020 | RD01052021 | ABC56 | DEF21 | A-1 |
| ... | ... | ... | ... | ... | ... | ... |

A chronological ("cron") job scheduler may periodically poll the database table. The cron job scheduler may retrieve entries from the database table. The cron job schedule may thus obtain the entries needed by a runtime compiler associated with the cron job scheduler.

The runtime compiler may process each database table entry. The runtime compiler may compile the objects identified in the database table. The runtime compiler may compile the objects in any suitable order. For example, the runtime compiler may compile the objects sequentially. The sequence may be defined by sorting the central database table by any one or more of the columns in the database table. After an object is compiled, the object may be loaded by a class loader into virtual machine memory. The object may then be passed to an API. The API may facilitate the induction of newly generated objects into the web application based on the interface identified in the database table.

The API may be configured to maintain thread integrity. Integrity may include proper concurrency of object processing in a multithreaded environment. Integrity may include thread safety. For example, if a compiler encounters a compilation error or other exceptional event, the API will skip remaining induction steps for the object for which the compilation error occurred. The API may select the version of an executable object that is to be executed in connection with a given request for information from a user. For example, the API may be configured such that whenever there is new object entry in the database, the API will pick up the executable for the new object, and supply the new executable on a going-forward basis whenever the behavior of the executable is invoked. If there are no such new entries, this API will continue to supply the old object for that behavior.

Some or all of this may happen dynamically with taking care of concurrency issues in multithreaded environment. After the API is updated with updated/revised objects, at the next invocation for a particular flow or service, the new object will be place on line. The old object may be automatically collected as garbage by an underlying virtual machine. This approach may avoid the need to restart a web server.

Apparatus and methods for deploying a web application including a plurality of binary objects, each corresponding to a class file, are provided. The apparatus may perform steps of the methods. The methods may include isolating from the plurality of class files a class file in which a run-time behavior occurs. The methods may include updating the class file to produce a modified class file that does not have the behavior. The methods may include testing performance of the modified class file. The methods may include writing metadata to the class file. The methods may include storing the class file in a dynamic configuration database. The methods may include recognizing the modified class file as being modified. The methods may include, using a cron job processor, reading the metadata. The methods may include compiling the modified class file into binary code. The methods may include, using the metadata, inducting into the application, in a run-time environment, the binary code corresponding to the modified class file. The methods may include executing the binary code instead of binary code corresponding to the class file in which the run-time behavior occurs. The methods may include, after the executing, removing the binary code corresponding to the class file in which the run-time behavior occurs from the run-time environment.

The updating may include updating only the class file. The testing may include testing performance of the modified class file without testing performance of the entire application. The methods may include providing to the database a copy of the updated class file, and not new copies of all other class files of the application. The methods may include providing to the database a copy of the updated class file, and not a new copy of any other class files of the application.

The inducting may include inducting into the application only the binary code corresponding to the modified class file, and not binary code corresponding to the whole application.

The using a cron job processor may include, using a cron job processor, reading, after a predetermined period, the metadata. The methods may include configuring the cron job processor to periodically poll the database to find the modified class file. The configuring may perform the recognizing.

The method may include identifying the run-time behavior in code of the web application. The method may include testing performance of the class file exhibiting the behavior. The method may include compiling the modified class file in a developer instance that does not include compilations of the other class files of the web application. The method may include comparing a test output from a compilation of the modified class file to an expected output of the compilation.

The testing may be a testing that does not include rebuilding the entire web application. The testing may be a testing that does not include deploying the entire web application in a run-time environment. The testing may be a testing that does not include deploying binary code corresponding to the modified class file in an offline data center that is configured, when online to respond to no less than 1,000,000 requests per day. The testing may be a testing that does not include providing a token to validate an external service call made by code corresponding to a class file that has a purpose that is different from a purpose of the modified class file.

The testing may be a testing that does not include aggregating run-time error logs corresponding to the class files of the web application.

The testing may be a testing that does not include performing a regression of first outputs from a modified version of the web application against second outputs that come from a previous version of the web application. The regression may be a regression that evaluates backward compatibility.

The method may include routing a flow of service requests to a data center of a plurality of data centers based on geographic proximity between a request and the data center. The method may include receiving at the data center a first request; then, performing the isolating; then, performing the executing; and continuing to route requests to the data center during a concurrent step of the process. Table 3 lists illustrative concurrent steps.

TABLE 3

| Illustrative illustrative concurrent steps |
| --- |
| The isolating |
| The updating |
| The testing |
| The writing |
| The storing |
| The recognizing |
| The reading |
| The compiling |
| The inducting |
| The executing |
| The removing |
| Other suitable illustrative concurrent steps |

The method may include, when the class file is of a plurality of class files, and the application is of a plurality of applications, writing metadata for each of the class files; storing all of the class files in the dynamic configuration database; tabulating all of the metadata for the class files into a database table; and, in response to a query from a user: identifying in the plurality of applications the application associated with the query; selecting from a first executable object having a class identifier and a second executable object having the same class identifier, an executable object corresponding to the modified class file.

FIG. 1 shows a prior-art approach to changing behavior of a web-based application of which a first instance runs at a first datacenter. At step 100, an enterprise may engage in a decision to commit to rebuilding the application. At step 102, a development team beings to work in a development environment to develop and test a new version of the application. At step 104, the development team undertakes, in a quality assurance ("QA") environment, a QA testing process of the new version of the application. At step 106, the development team undertakes a product deployment process for the new version of the application. At step 108, the enterprise routes all traffic intended for the first instance to a second instance at a second datacenter that continues to run a second instance of the application that is similar or identical to the first instance. At step 110, the enterprise begins to deploy, at the first data center, an updated version of the application. At step 112, the enterprise formulates tokens to validate calls to external data and authentication services for the revised part of the new version of the application. At step 114, the enterprise checks the results of the calls and determines whether the results are correct or in error. The checking involves aggregating logs of runtime errors. At step 116, the enterprise formulates tokens to validate calls to external data and authentication services for the entire new version of the application, and compares the results to the results of the same test as applied to the previous version of the application. The comparison involves a regression analysis that tests backwards compatibility of the changed parts of the new version. At step 118, the enterprise may decide that a regression score is too low to go "live" with the new version. If the regression score is too low to go "live" with the new version, the process reverts to commit-and-rebuild step 100.

If the regression score is sufficient to go "live" with the new version, the new version becomes a new instance of the application running at the first datacenter, and the process advances to step 120. At step 120, the enterprises reroutes the de-routed traffic to the first datacenter. At step 122, the enterprise may begin replacing versions of the application at the second, or third, fourth, etc., datacenters. If so, the traffic to each of the datacenters must be routed away from them so that the new version can be brought on line.

Figure 2:
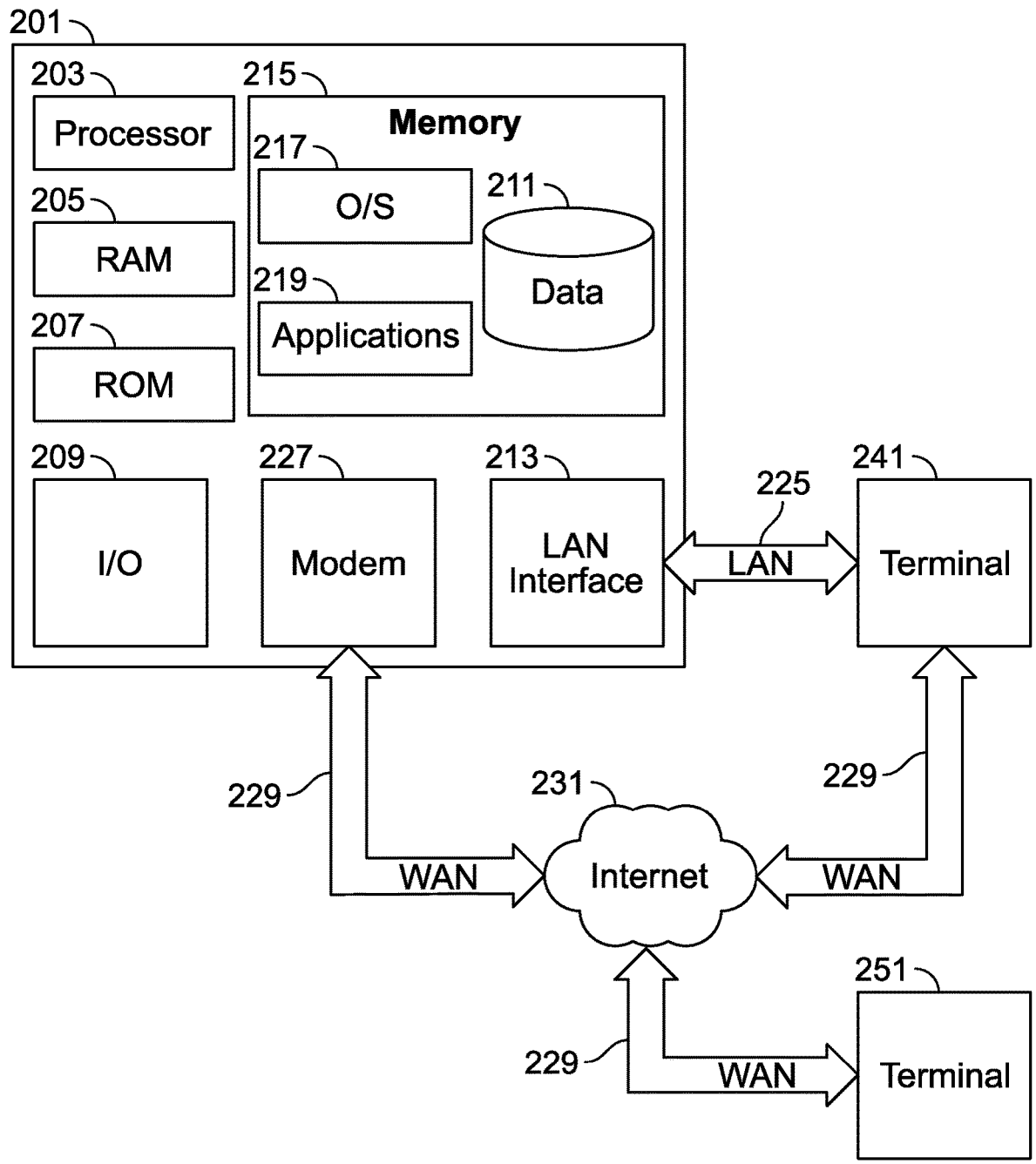
FIG. 2 shows an illustrative schema in accordance with principles of the invention.

FIG. 2 is a block diagram that illustrates a computing server 201 (alternatively referred to herein as a "server or computer") that may be used in accordance with the principles of the invention. The server 201 may have a processor 203 for controlling overall operation of the server and its associated components, including RAM 205, ROM 207, input/output ("I/O") module 209, and memory 215.

I/O module 209 may include a microphone, keypad, touchscreen and/or stylus through which a user of server 201 may provide input, and may also include one or more of a speaker for providing audio output and a video display device for providing textual, audiovisual and/or graphical output. Software may be stored within memory 215 and/or other storage (not shown) to provide instructions to processor 203 for enabling server 201 to perform various functions. For example, memory 215 may store software used by server 201, such as an operating system 217, application programs 219, and an associated database 211. Alternatively, some or all of computer executable instructions of server 201 may be embodied in hardware or firmware (not shown).

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks.

When used in a LAN networking environment, server 201 is connected to LAN 225 through a network interface or adapter 213.

When used in a WAN networking environment, server 201 may include a modem 227 or other means for establishing communications over WAN 229, such as Internet 231.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 219, which may be used by server 201, may include computer executable instructions for invoking user functionality related to communication, such as email, short message service (SMS), and voice input and speech recognition applications.

Computing server 201 and/or terminals 241 or 251 may also be mobile terminals including various other components, such as a battery, speaker, and antennas (not shown). Terminal 251 and/or terminal 241 may be portable devices such as a laptop, tablet, smartphone or any other suitable device for receiving, storing, transmitting and/or displaying relevant information.

Any information described above in connection with database 211, and any other suitable information, may be stored in memory 215. One or more of applications 219 may include one or more algorithms that may be used to perform the functions of one or more of a dynamic configuration database, a cron job processor, a request handler, an API, a class loader and a run-time compiler, and perform any other suitable tasks.

The apparatus and methods may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The apparatus and methods may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
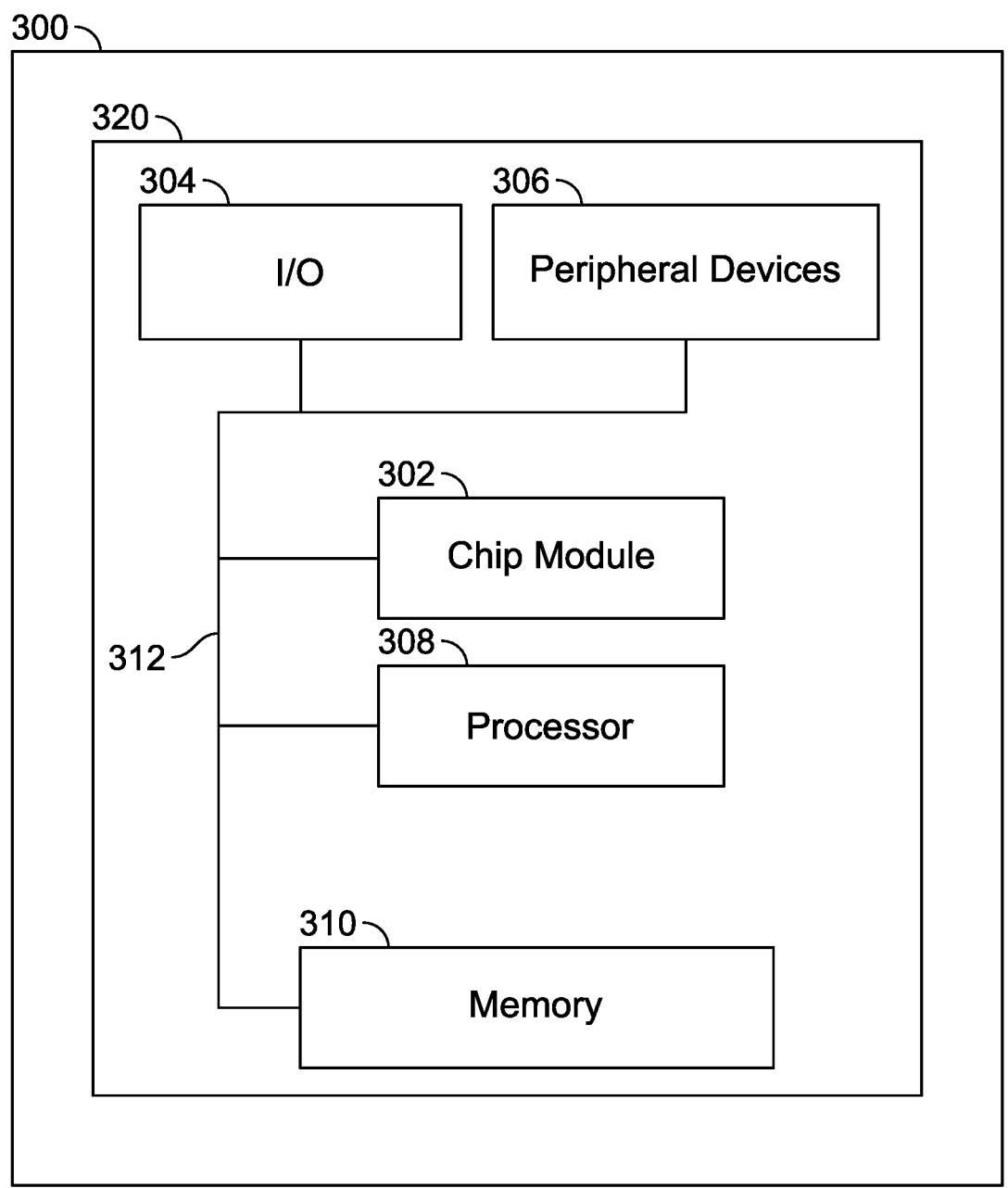
FIG. 3 shows an illustrative schema in accordance with principles of the invention.

FIG. 3 shows illustrative apparatus 300 that may be configured in accordance with the principles of the invention.

Apparatus 300 may be a computing machine. Apparatus 300 may include one or more features of the apparatus that is shown in FIG. 1.

Apparatus 300 may include chip module 302, which may include one or more integrated circuits, and which may include logic configured to perform any other suitable logical operations.

Apparatus 300 may include one or more of the following components: I/O circuitry 304, which may include a transmitter device and a receiver device and may interface with fiber optic cable, coaxial cable, telephone lines, wireless devices, PHY layer hardware, a keypad/display control device or any other suitable encoded media or devices; peripheral devices 306, which may include counter timers, real-time timers, power-on reset generators or any other suitable peripheral devices; logical processing device 308, which may solve equations and perform other methods described herein; and machine-readable memory 310.

Machine-readable memory 310 may be configured to store in machine-readable data structures associated with a dynamic configuration database, a cron job processor, a request handler, an API, a class loader and a run-time compiler, and perform any other suitable information or data structures.

Components 302, 304, 306, 308 and 310 may be coupled together by a system bus or other interconnections 312 and may be present on one or more circuit boards such as 320. In some embodiments, the components may be integrated into a single chip.

The chip may be silicon-based.

Figure 4:
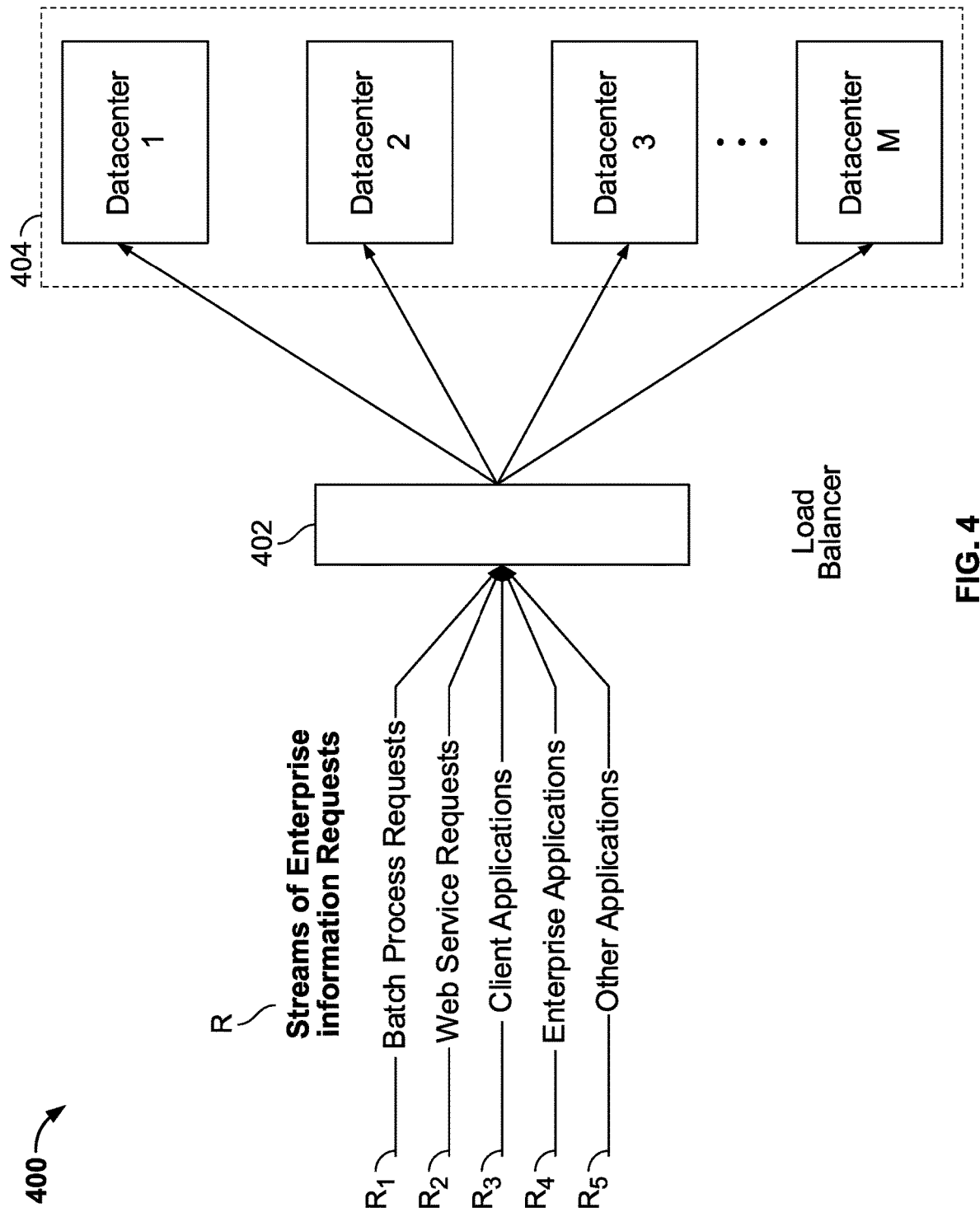
FIG. 4 shows an illustrative schema in accordance with principles of the invention.

FIG. 4 shows in part illustrative enterprise information-request handling architecture 400. Load balancer 402 may receive numerous streams of information requests R. The information requests may include batch processing requests $R_1$. The information requests may include web service requests $R_2$. The information requests may include client application requests $R_3$. The information requests may include enterprise application requests $R_4$. The request may come from other applications $R_j$.

Architecture 400 may include datacenter array 404. Each of M datacenters in array 404 may support instances of N different applications (not shown). Each application may be instanced on one of N distinct virtual machines.

Load balancer 402 may identify the geographic origin of each request. Load balancer 402 may route each request to a datacenter in array 404 that is geographically most near the origin of the request. Array 404 may include M datacenters.

Figure 5:
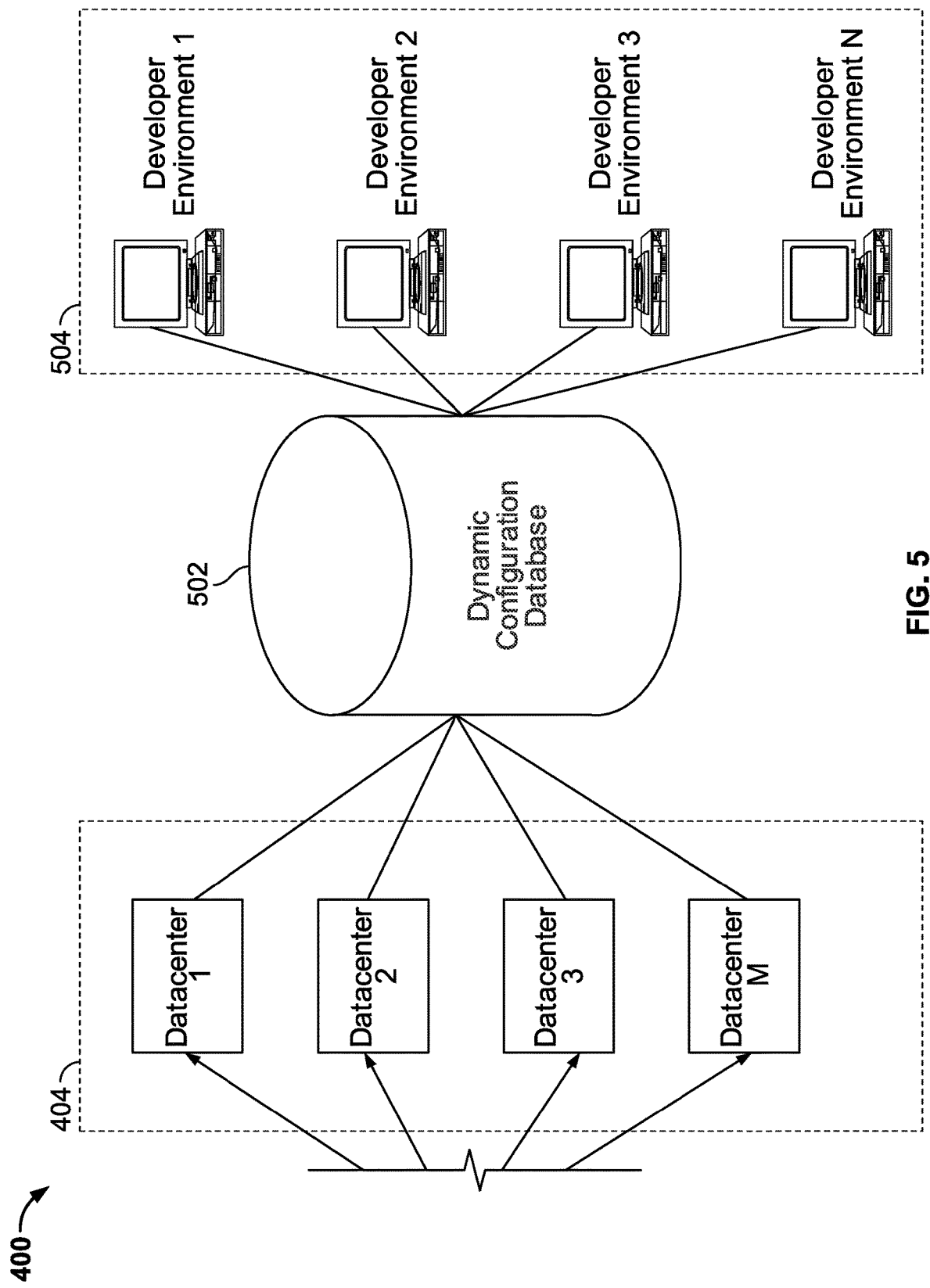
FIG. 5 shows an illustrative schema in accordance with principles of the invention.

FIG. 5 shows in part illustrative architecture 400. Architecture 400 may include dynamic configuration database 502. Database 502 may store updated objects for applications in the datacenters of datacenter array 404. Database 502 may store original or non-updated objects for applications in the datacenters of datacenter array 404.

Architecture 400 may include object updating function 504. Function 504 may include developer environments 1 . . . N. Each of developer environments 1 . . . N may correspond to one of the N applications that may be instanced at the M datacenters.

Figure 6:
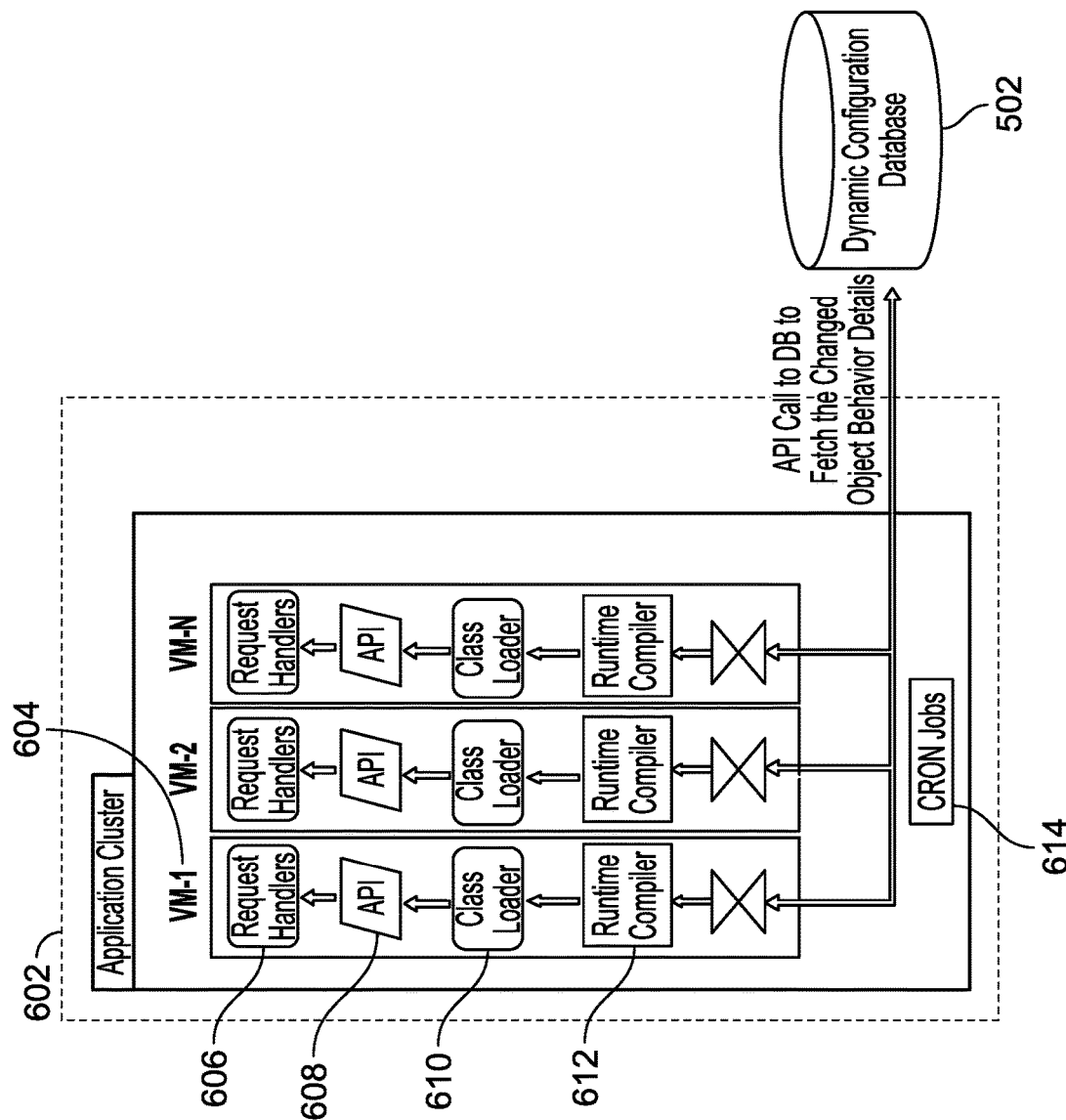
FIG. 6 shows an illustrative schema in accordance with principles of the invention.

FIG. 6 shows illustrative datacenter 602. Datacenter 602 may correspond to one of datacenters 1 . . . M (shown in FIG. 5). Datacenter 602 may support virtual machines ("VM") 1 . . . N. Each virtual machine may run an instance of one of application 1 . . . N. Virtual machine 604 is an illustrative virtual machine. Virtual machine 604 may include request handler 606. Virtual machine 604 may include API 608. Virtual machine 604 may include class loader 610. Virtual machine 604 may include runtime compiler 612. Datacenter 602 may support cron jobs processor 614. Run-time compiler 612 may be in data communication with cron jobs processor 614. Cron jobs processor 614 may be in data communication with dynamic configuration database 502.

For the sake of illustration, the steps of the illustrated processes will be described as being performed by a "system." A "system" may include one or more of the features of the apparatus and schemae that are shown in FIG. 2-FIG. 6 and/or any other suitable device or approach. The "system" may include one or more means for performing one or more of the steps described herein.

Figure 7:
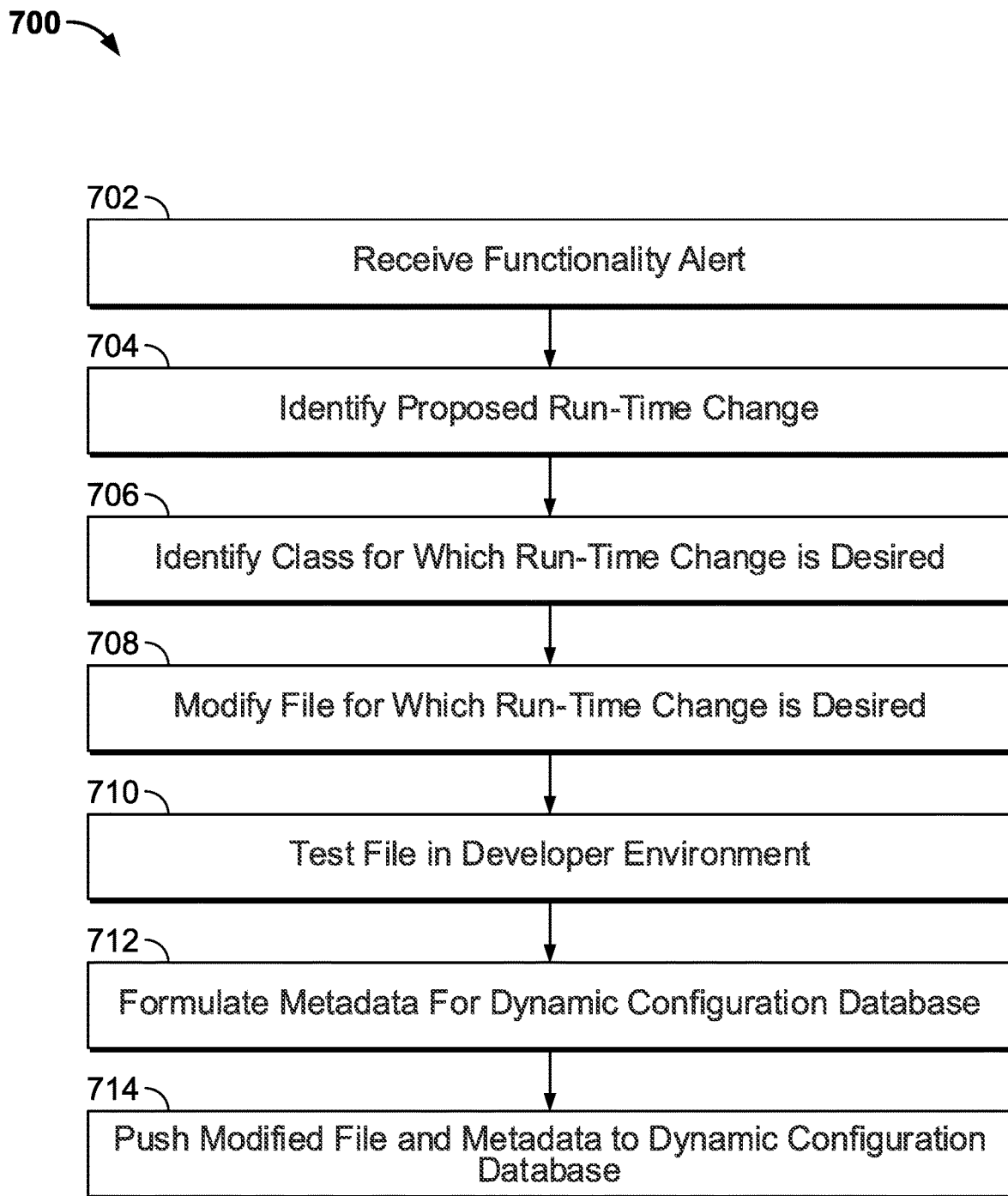
FIG. 7 shows illustrative steps of a process in accordance with principles of the invention.

FIG. 7 shows illustrative steps of a developer environment process 700. At step 702 a developer in the system may receive a functionality alert. At step 704, the developer may identify a proposed run-time change. At step 706, the developer may identify a class for which run-time change is desired. At step 708, the developer may modify a file for which run-time change is desired. At step 710, the developer may test the file in the developer environment. At step 712, the developer may formulate metadata for a dynamic configuration database. At step 714, the developer may push the modified file and the metadata to the dynamic configuration database.

Figure 8:
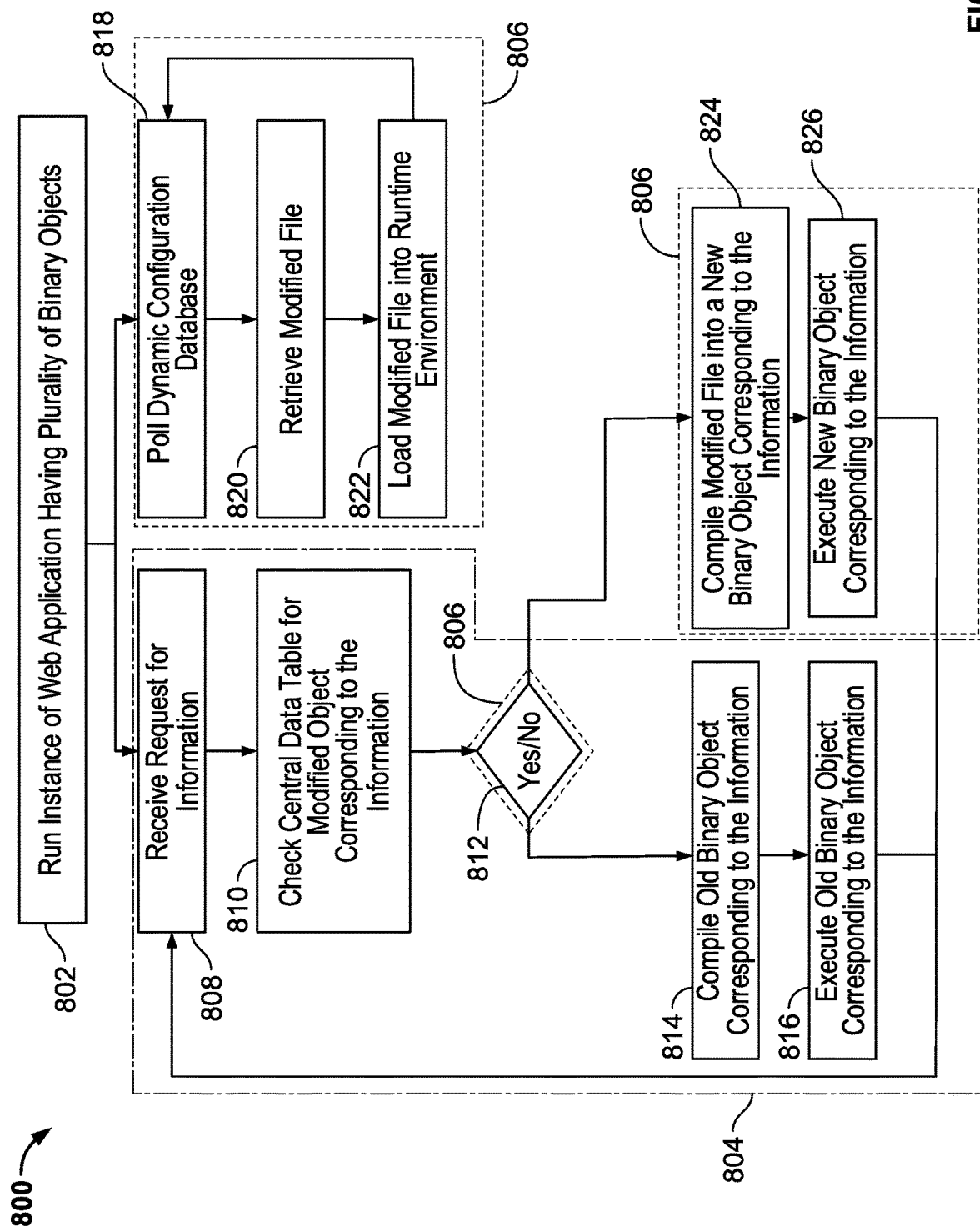
FIG. 8 shows illustrative steps of a process in accordance with principles of the invention.

FIG. 8 shows illustrative steps of process 800 for hot-swapping objects. Process 800 may begin at step 802. At step 802, the system may run an instance of a web application that includes a plurality of binary objects. Process 800 may include principal flow 804 (broken line). Process 800 may include principal flow 806 (dotted line). Principal flows 804 and 806 may run concurrently.

Principal flow 804 may include steps 808, 810, 812, 814 and 816. At step 808, the system may receive a request for information. At step 810, the system may check a central data table for a record indicating existence of a modified object corresponding to the information. At step 812, if there is such a record, principal flow 804 may continue at step 814. At step 814, the system may compile an old binary object corresponding to the information. The old binary object may be a binary object that was previously invoked in response to a request for information. At step 816, the system may execute the old binary object corresponding to the information. Principal flow 804 may continue at step 808.

Principal flow 806 may include steps 818, 820, 822, 824, 812 and 826. At step 818, the system may poll the dynamic configuration database to identify a modified file. At step 820, the system may retrieve the modified file. At step 822, the system may load the modified into the run-time environment. If, at step 812, the system recognizes the new modified file, principal flow 806 may continue at step 824. At step 824, the system may compile the modified file into a new binary object corresponding to the information. At step 826, the system may execute the new binary object corresponding to the information. Principal flow 804 may continue at step 818.

In the subsequent iteration of principal flow 804, the new binary object corresponding to the information will become an old binary object. Principal flow 804 may run continuously. Principal flow 806 may run continuously. API 608 may govern conflicts between principal flow 804 and principal flow 806. For example, if there is a compilation error at step 824, API 608 may return control to principal flow 804, which may continue at step 814.

The steps of methods may be performed in an order other than the order shown and/or described herein. Embodiments may omit steps shown and/or described in connection with illustrative methods. Embodiments may include steps that are neither shown nor described in connection with illustrative methods.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Illustrative method steps may be combined. For example, an illustrative process may include steps shown in connection with another illustrative process.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods and apparatus for deploying a web application have been provided. Persons skilled in the art will appreciate that the present invention may be practiced by other than the described embodiments, which are presented for purposes of illustration rather than of limitation.

What is claimed is:

1. A method for deploying a web application including a plurality of binary objects, each of the binary objects corresponding to a class file, the method comprising:
    isolating from the plurality of binary objects a class file in which a run-time behavior occurs;
    updating the class file to produce a modified class file that does not have the behavior;
    testing performance of the modified class file;
    writing metadata to the class file;
    storing the class file in a dynamic configuration database;
    recognizing the modified class file as being modified;
    using a cron job processor, reading the metadata;
    compiling the modified class file into binary code;
    using the metadata, inducting into the application, in a run-time environment, the binary code corresponding to the modified class file;
    executing the binary code corresponding to the modified class file instead of the binary code corresponding to the class file in which the run-time behavior occurs;
    after the executing, the method further comprising removing the binary code corresponding to the class file in which the run-time behavior occurs from the run-time environment; and
    wherein the inducting includes inducting into the application only the binary code corresponding to the modified class file, and not the binary code corresponding to the class file in which the run-time behavior occurs.

2. The method of claim 1 further comprising identifying the run-time behavior in code of the web application.

3. The method of claim 1 further comprising testing performance of the class file exhibiting the behavior.

4. The method of claim 1 wherein the testing comprises compiling the modified class file in a developer instance that does not include compilations of other class files of the web application.

5. The method of claim 4 wherein the testing further comprises comparing a test output from a compilation of the modified class file to an expected output of the compilation.

6. The method of claim 1 wherein the testing does not include rebuilding the entire web application.

7. The method of claim 1 wherein the testing does not include deploying the entire web application in the run-time environment.

8. The method of claim 1 wherein the testing does not include deploying the binary code corresponding to the modified class file in an offline data center that is configured, when online to respond to no less than 1,000,000 requests per day.

9. The method of claim 1 wherein the testing does not include providing a token to validate an external service call made by code corresponding to the class file that has a purpose that is different from a purpose of the modified class file.

10. The method of claim 1 wherein the testing does not include performing a regression of first outputs from a modified version of the web application against second outputs that come from a previous version of the web application.

11. The method of claim 10 wherein the regression is configured to evaluate backward compatibility.

12. The method of claim 1 further comprising:
    routing a flow of service requests to a data center of a plurality of data centers based on geographic proximity between a request and the data center;
    receiving at the data center a first request; then, performing the isolating; then, Performing the executing;
    continuing to route request to the data center during the isolating.

13. The method of claim 1 further comprising:
    routing a flow of service requests to a data center of a plurality of data centers based on geographic proximity between a request and the data center;
    receiving at the data center a first request; then, performing the isolating;
    then, performing the executing;
    continuing to route request to the data center during the updating.

14. The method of claim 1 further comprising:
    routing a flow of service requests to a data center of a plurality of data centers based on geographic proximity between a request and the data center;
    receiving at the data center a first request; then, performing the isolating; then, performing the executing;
    continuing to route request to the data center during the testing.

15. The method of claim 1 further comprising:
    routing a flow of service requests to a data center of a plurality of data centers based on geographic proximity between a request and the data center;
    receiving at the data center a first request; then, performing the isolating; then, performing the executing;
    continuing to route request to the data center during the writing.

16. A method for deploying web applications, the method comprising:

running a web application on a virtual machine, the web application:
  providing to a first user a service; and
  including an old class file;
updating the old class file to form a new class file;
storing the new class file in a dynamic configuration database;
in response to a query from a user identifying the application, from among a plurality of applications, as corresponding to the query:
compiling the new class file into binary code; and
in a run-time environment of the application, inducting into the application, a first executable object having a class identifier, and not inducting a second executable object having the same class identifier, the inducting operating on an executable object corresponding to binary code associated with the new class file, and not to the old class file;
the method further comprising of removing, and not replacing, a selection of the binary code corresponding to the old class file from the run-time environment;
the web application is a first web application that provides a first service to a first user, the new class file is a first new class file, and the query is a first query:
  running a second web application on a second virtual machine, the second web application:
    providing to a second user a second service that is different from the first service;
    and including a second old class file;
    updating the second old class file to form a second new class file;
    storing the second old class file in the dynamic configuration database;
    in response to a second query from a second user:
    identifying in the plurality of applications the second application as being associated with the second query; and
    selecting, in a run-time environment of the second application, from the first executable object having the class identifier and the second executable object having the same class identifier, the executable object corresponding to the second new class file.

17. The method of claim 16 further comprising:
routing a flow of service requests to a data center of a plurality of data centers based on geographic proximity between a request and the data center;
performing the inducting; and
continuing to route request to the data center during the inducting.

18. The method of claim 17 further comprising configuring a cron job processor to periodically poll a database to determine which of a plurality of executable objects to induct in the inducting step.

* * * * *